United States Patent Office 3,532,722
Patented Oct. 6, 1970

3,532,722
SPIRO[DIBENZO[a,d] [1,4] CYCLOHEPTADIENE-5-4′ - TETRAHYDROFURFURYLAMINE] AND MONO- AND DIALKYLATED DERIVATIVES AND THEIR SALTS
Bernard Belleau, Ottawa, Ontario, and Ivo Monkovic, Candiac, Quebec, Canada, assignors, by mesne assignments, to Bristol-Myers Company, New York, N.Y., a corporation of Delaware
No Drawing. Filed Mar. 15, 1968, Ser. No. 713,295
Int. Cl. C07d 5/32
U.S. Cl. 260—347.7                    6 Claims

ABSTRACT OF THE DISCLOSURE

Compounds of the formulae

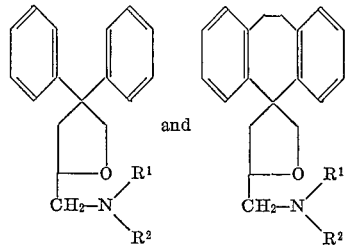

where $R^1$ and $R^2$ are each hydrogen or (lower)alkyl and the pharmaceutically acceptable nontoxic salts thereof exhibit antidepressant activity and are useful as antidepressant agents in mamals.

BACKGROUND OF THE INVENTION

Field of the invention

This invention relates to novel chemical compounds. More particularly, this invention relates to novel chemical compounds which possess valuable therapeutic utility as antidepressant agents in mammals. In another aspect this invention relates to a method of preparing the novel compounds.

Description of the prior art

There exists a need to provide additional agents useful as antidepressants. Thus it is an object of this invention to provide a new class of compounds having antidepressant activity.

SUMMARY OF THE INVENTION

The above and other objects which may appear as the specification proceeds are achieved by this invention which comprises the provision of compounds selected from the group consisting of compounds having the formulae

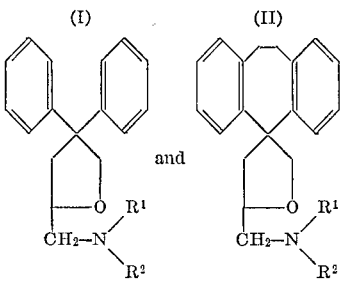

wherein $R^1$ and $R^2$ are each hydrogen or (lower)alkyl; and the pharmaceutically acceptable nontoxic salts thereof.

The pharmaceutically acceptable nontoxic salts include the organic and inorganic acid addition salts, e.g., those prepared from acids such as hydrochloric, sulfuric, sulfamic, tartaric, fumaric, hydrobromic, hydriodic, glycolic, citric, maleic, phosphoric, succinic, acetic, nitric and the like. Such salts are prepared by conventional methods.

The term "(lower)alkyl" as used herein means both straight and branched chain alkyl radicals containing from 1 to 8 carbons atoms, e.g., methyl, ethyl, propyl, isopropyl, butyl, isobutyl, t-butyl, amyl, hexyl, 2-ethylhexyl, etc.

A preferred embodiment of the present invention consists of compounds of the formula (III)

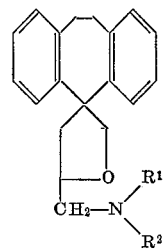

wherein $R^1$ and $R^2$ are as described above and the pharmaceutically acceptable nontoxic salts thereof.

A still more preferred embodiment of the present invention consists of compounds of the formula (IV)

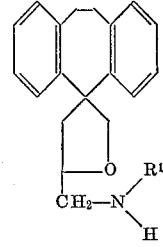

wherein $R^1$ is (lower)alkyl.

The comyounds of this invention are prepared as exemplified below by reacting a compound of the formulae (V) 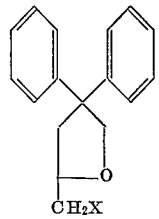 and (VI) 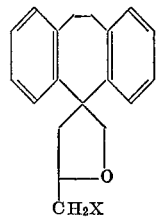

where X is chloro, bromo or iodo but preferably bromo with an amine of the formula (VII) 

where $R^1$ and $R^2$ are as described above in a nonreactive solvent, such as dimethylsulfoxide, dimethylformamide, benzene, ether and the like. The reaction is conveniently carried out at elevated temperatures e.g., 40 to 100° C. and preferably at about 55–60° C. Obviously the compounds of Formula V are used to prepare the compounds of Formula I and the compounds of Formula VI are used to produce the compounds of Formula II.

The starting materials of Formula VI are prepared according to the following reaction scheme, the steps of which are exemplified below:

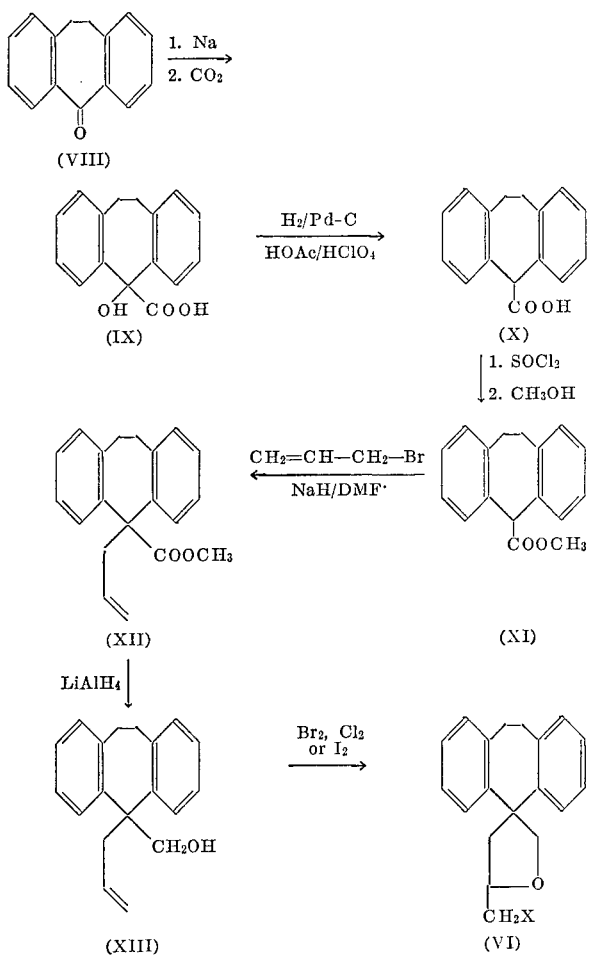

wherein X is as described above. The preparation of compound IX is described in Netherlands Pat. No. 6,513,732.

The starting materials of Formula V are prepared according to the following reaction scheme, the steps of which are exemplified below:

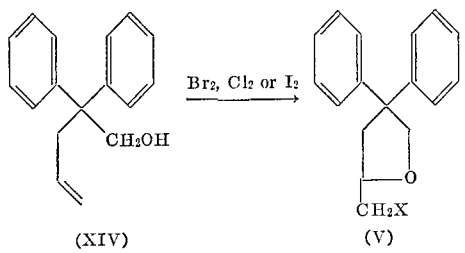

wherein X is as described above. The preparation of the compound of Formula XIV is described by R. L. Rowland, J. Am. Chem. Soc., 73, 2381 (1951).

Alternatively the compounds of this invention where $R^2$ is hydrogen are prepared by reaction of compound V or VI with a (lower)alkylbenzylamine followed by debenzylation e.g., according to the procedure described in J. Org. Chem., vol. 26, p. 4057 (1961) or by hydrogenation in the presence of a catalyst e.g., palladium.

The compounds of this invention contain an asymmetric carbon atom, and thus normally occur as a racemic mixture of the two optical isomers. The racemates are resolved into the optical isomers according to known resolution procedures, for example by resolution with an optically active acid, e.g., mandelic acid by the procedure used on amines e.g., α-phenethylamine and amphetamine. The racemic mixtures and the individual optical isomers are within the scope of this invention.

The compounds of this invention are valuable pharmaceutical agents. They exert an antidepressant effect in mammals and are therefore useful as antidepressant agents.

The antidepressant effect of the compounds of this invention is demontrated by their ability to prevent the sedative effects of reserpine in mice. Oral administration of as little as 2.5 mg./kg. of a preferred compound of the present invention, spiro[dibenzo[a,d] [1,4] cycloheptadiene - 5-4'-N-methyltetrahydrofurfurylamine] hydrochloride (XV), in mice three hours before intravenous administration of 5 mg./kg. of reserpine completely prevented symptoms usually associated with reserpine administration i.e., increased motor activity, profuse salivation and ptosis. Spiro[dibenzo[a,d] [1,4] cycloheptadiene - 5-4' - N,N-dimethyltetrahydrofurfurylamine oxalate (XVI), N,N-dimethyl-4,4-diphenyltetrahydrofurfurylamine hydrochloride (XVII), and 4,4-diphenyl - N-methyltetrahydrofurfurylamine hydrochloride (XVIII) were active at 2.5 mg./kg., 10 mg./kg. and 5 mg./kg. respectively in the foregoing test. Thus these compounds exhibit marked antidepressant activity. The foregoing compounds have the following $LD_{50}$ (oral) in the mouse.

| Compound: | $LD_{50}$, mg./kg. |
|---|---|
| XV | 1200 |
| XVI | >300 |
| XVII | 200 |
| XVIII | 150 |

The compound of this invention may be administered as the free bases or in the form of their nontoxic addition salts. They may be compounded and formulated into pharmaceutical preparations for oral or parenteral administration with organic or inorganic solid materials or liquids which are pharmaceutically acceptable carriers. Some examples of the carriers which can be used are gelatin capsules, sugars, cellulose derivatives such as carboxymethylcellulose, gelatin, talc, magnesium stearate, vegetable oil such as peanut oil, etc., liquid petroleum, glycerin, sorbitol, ethanol, agar, elixirs, syrups and water including sterile water. The compositions may take the form of tablets, powders, granules, capsules, suspensions, solutions, and the like.

The compounds of this invention when administered orally or parenterally in an effective amount are effective in treating depression in mammals. A dosage range of about 1 to about 100 milligrams per kilogram per day is convenient which may be administered in divided dosage, e.g., two, three or four times a day. Administration of the compounds is conveniently begun at the minimal effective dose (MED) of the particular compound in the particular species of mammal. However, in general, the particular dosage most suitable for a particular application, as might be expected, will vary with the age, weight and general health of the mammal under treatment and the degree of antidepressant effect required. After taking into consideration these factors and any other factors to be considered, one skilled in the art of treating disease of mammals can readily determine the appropriate dosage.

The following examples are intended to illustrate the invention described herein without unduly restricting it.

EXAMPLE 1

Preparation of 4,4-diphenyltetrahydrofurfuryl bromide

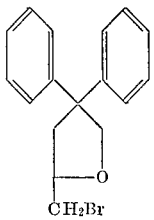

To a stirred and cooled solution of 6.7 g. (0.028 moles) of 2,2-diphenyl-4-pentenol (prepared by the procedure described by R. L. Rowland, J. Am. Chem. Soc., 73, 2381 (1951)) in carbon tetrachloride (30 ml.) was added, dropwise, a solution of 4.5 g. of bromide in carbon tetrachloride (20 ml.). During the addition an evolution of gaseous hydrogen bromide was observed. After the addition had been completed, the reaction mixture was concentrated in vacuo. The residual oil was purified by distillation andt he fraction boiling at 125–130° C./0.003 mm. was collected.

*Analysis.*—Calcd. for $C_{17}H_{17}BrO$ (percent): C, 64.34; H, 5.40. Found (percent): C, 65.06; H, 5.51.

*Analysis.*—Calcd. for $C_{19}H_{23}NO \cdot HCl \cdot \frac{1}{2}CH_3OH$ (percent): C, 70.33; H, 7.80; N. 4.20. Found (percent) C, 70.16; H, 7.58; N, 4.13.

EXAMPLE 2

Preparation of N,N-dimethyl-4,4-diphenyltetrahydrofurfurylamine hydrochloride

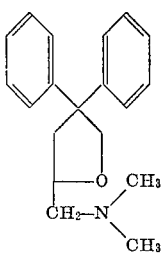

A total of 1.6 g. (35.5 mmoles) of gaseous dimethylamine was introduced into a cooled solution of 2 g. (6.31 moles) of 4,4-diphenyltetrahydrofurfuryl bromide in dimethylsulfoxide (6 ml.) contained in a glass tube. The tube was sealed and then heated at 55–60° C. during 16 hours. After, cooling, the contents of the tube were poured into water (20 ml.) and the resulting mixture was extracted with benzene (20 ml.). The benzene extract was washed with water (3× 20 ml.) and then extracted with a 2 N solution of aqueous hydrochloric acid (2× 10 ml.). The combined aqueous extracts were basified with sodium carbonate and extracted with benzene (2× 10 ml.). The benzene solution was dried over potassium carbonate and then concentrated at reduced pressure. The residual oil was taken up in dry ether (20 ml.) and the resulting solution was treated with dry hydrogen chloride gas. The crystalline hydrochloride thus obtained was recrystallized twice from a methanolether mixture and dried in vacuo with phosphorous pentoxide for 20 hours at 45° C. Yield 1.36 g. (68%). This product contains half a mole of methanol of crystallization.

*Analysis.*—Calcd. for $C_{18}H_{21}NO \cdot HCl$ (percent) C, 71.16; H, 7.30; N, 4.61. Found (percent) C, 70.54; H, 7.16; N, 4.51.

EXAMPLE 3

Preparation of 4,4-diphenyl-N-methyltetrahydrofurfurylamine hydrochloride

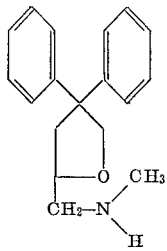

A total of 1.5 g. (50 mmoles) of gaseous methylamine was introduced into a cooled solution of 2 g. (6.31 mmoles) of 4,4-diphenyltetrahydrofurfuryl bromide in dimethylsulfoxide (6 ml.) contained in a glass tube. The tube was sealed and then heated at 55–60° C. during 16 hours. After, cooling, the contents of the tube were poured into water (20 ml.) and the resulting mixture was extracted with benzene (20 ml.). The benzene extract was washed with water (3× 20 ml.) and then extracted with a 2 N solution of aqueous hydrochloric acid (2× 10 ml.). The combined aqueous extracts were basified with sodium carbonate and extracted with benzene (2× 10 ml.). The benezene solution was dried over potassium carbonate and then concentrated at reduced pressure. The residual oil was taken up in dry ether (20 ml.) and the resulting solution was treated with dry hydrogen chloride gas. The crystalline hydrochloride thus obtained was recrystallized twice from a methylene chloride ether mixture and dried in vacuo with phosphorous pentoxide for 20 rours at 45° C. Yield 1.24 g. (65%). The product had a melting point of 169–170° C.

EXAMPLE 4

When in the procedure of Example 2 dimethylamine is replaced by an equal molar amount of ammonia, diethylamine, ethylamine, isopropylamine, propylamine, methylethylamine, butylamine, hexylamine, pentylamine, dibutlyamine, octylamine and dipropylamine there are obtained.

4,4-diphenyltetrahydrofurfurylamine
N,N - diethyl - 4,4 - diphenyltetrahydrofurfurylamine
N - ethyl - 4,4 - diphenyltetrahydrofurfurylamine
N - isoroply - 4,4 - dipenyltetrahydrofurfurylamine
N - propyl - 4,4-diphenyltetrahydrofurfurylamine
N - methyl - N - ethyl-4,4-diphenyltetrahydrofurfurylamine
N - butyl - 4,4 - diphenyltetrahydrofurfurylamine
N - hexyl - 4,4 - diphenyltetrahydrofurfurylamine
N - pentyl - 4,4 - diphenyltetrahydrofurfurylamine
N,N - dibutyl - 4,4 - diphenyltetrahydrofurfurylamine
N-octyl-4,4-diphenyltetrahydrofurfurylamine and
N,N - dipropyl - 4,4 - diphenyltetrahydrofurfurylamine respectively.

EXAMPLE 5

Preparation of compound IX

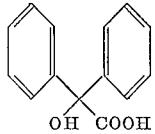

(Procedure described in Netherlands Pat. No. 6,513,-732.)

Dioxan (100 ml.) was distilled from lithium aluminum hydride directly into a 250 ml. 3-necked flask fitted with a mechanical stirrer (Note 1), a thermometer, and an inlet tube to allow the introduction of purified, dry, nitrogen (Note 2). The apparatus was charged with 2.445 g. (106.3 mmoles) of sodium (Note 3) and the mixture was heated until the sodium melted (Note 4). At this point vigorous stirring was initiated; when the sodium had reached a state of fine dispersion, heating was discontinued, but the stirrer was not stopped until the mixture had reached room temperature. The mixture was cooled to about 15° C. and 10.41 g. (50 mmoles) of the ketone was added over a 5 minute period (Note 5). When the addition was completed, the mixture was stirred vigorously at room temperature for 2 hours. (The deep blue color of the radical anion developed very rapidly.) To the above mixture was cautionsly added finely pulverized, solid, carbon dioxide with vigorous stirring. The blue color fades very rapidly and the mixture becomes difficult to sir efficiently. It is important that a large excess of carbon dioxide be added. When enuogh carbon dioxide is present, sufficient tetrahydrofuran is added to allow good stirring, and then methanol is added cautiously to decompose the excess sodium (Note 6). When all of the sodium has been decomposed the mixture is diluted with a large volume of water, and the unreacted ketone was removed by extraction into dichloromethane. This extract was dried over sodium sulfate, the solvent was removed in vacuo and the residue was evaporatively distilled in vacuo (125/0.005 mm.) to give 3.98 g. of the starting ketone.

The basic aqueous phase from above was cautiously acidified with concentrated hydrochloric acid. After cooling in ice, the product was collected by filtration, washed well with ice water, and dried in vacuo. The yield of acid was 7.9 g. (100% based on starting material consumed), M.P. 210–215° C. d. (Note 7).

NOTES (1) A paddle stirrer was used.

(2) The apparatus was dried for several hours at 110–120° C.

(3) This and all subsequent operations must be performed in a nitrogen atmosphere.

(4) 90–100° C. It is simplest to heat the dioxan to gentle reflux.

(5) The reaction temperature should not exceed 25° C. during this operation.

(6) A solution of aqueous methanol (1:1) can be used, but extreme caution must be exercised. It is preferable that the reaction mixture be maintained in an ice bath under an atmosphere of nitrogen during this operation. Only when the decomposition of the sodium is complete can the nitrogen supply be shut off.

(7) The decomposition point depends on the rate of heating. The compound undergoes much prior darkening.

This crude product was purified by evaporative distilation in an air-bath (B.P. 140–150° C./0.01 mm.) giving a pale yellow, very viscous oil (2.69 g., 92%). Calculated for $C_{20}H_{20}O_2$ (percent): C, 82.15; H, 6.89. Found (percent): C, 81.83; H, 6.67.

EXAMPLE 6

Preparation of compound X

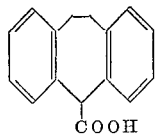
COOH

A suspension of compound IX (5.095 g., 20 mmoles) in 100 ml. of glacial acetic acid containing 4 ml. (Note 8 of 60% perchloric acid and 510 mg. of 10% palladium on charcoal was hydrogenated at room temperature and on initial pressure of 45 p.s.i.g. The theoretical amount of hydrogen is absorbed in 2–3 hours. The mixture (Note 9) was warmed until solution occurred and the hot mixture was filtered through celite. The filter cake was washed with a little hot acetic acid and the combined filtrates were concentrated to a small volume in vacuo. The residue was quantitatively transferred to another vessel with a little acetic acid and a large excess of ice water was added. The crystalline solid was collected by filtration, washed well with ice cold water and dried in vacuo. The produced weighed 3.970 g. and had M.P. 216–218° C. (83% yield).

NOTES (8) I.e., 2 ml./mmole. Less acid results in under reduction.

(9) A large amount of the acid crystallizes out of solution during the hydrogenation.

EXAMPLE 7

Preparation of compound XI

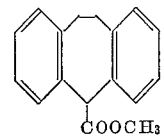
COOCH₃

5.159 g. (21.7 mmoles) of compound X and 5.2 g. of thionyl chloride in 20 ml. of benzene was heated on a steam bath for 3 hours. The solution was cooled, the solvent and excess thionyl chloride was removed in vacuo and the residual oil was taken up in 50 ml. of anhydrous benzene to which had been added 5 ml. of methanol, and the solution was heated at reflux temperature for 18 hours. The cooled solution was shaken with sodium carbonate solution (100 g/l.), then with water, and finally it was dried over anhydrous sodium sulfate. The solvent was removed in vacuo and the residue was taken up in hot cyclohexane. This solution was diluted with an equal volume of petroleum ether and on cooling it (B.P. 35–60° C.) gave 4.185 g. of a solid with M.P. 92–93° C. The mother liquors were evaporated and the residue was crystallized as above to give an additional 0.131 g. of product M.P. 92–92.5° C. Yield 4.316 g. (79.8%). For analysis the ester was crystallized once more from the above solvent system. After drying in vacuo at room temperature over phosphorous pentoxide for 24 hours it had M.P. 93.5–95° C. Calcd. for $C_{17}H_{16}O_2$ (percent): C, 80.92; H, 6.39. Found (percent): C, 81.91; H, 6.25.

EXAMPLE 8

Preparation of 5-allyl-5-carbomethoxydibenzo [a,d] [1,4] cycloheptadiene (XII)

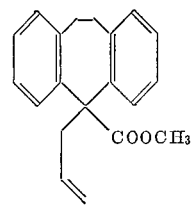
COOCH₃

1.0 g. (25 mmoles of NaH) of 60% sodium hydride in oil dispersion was washed free of oil with 3× 10 ml. of hexane. It was treated with 15 ml. of dry dimethylformamide and cooled to 0° C. A solution of compound XI (2.52 g., 10 mm.) and allyl bromide (3.03 g., 25 mm.) in 25 ml. or dry dimethylformamide was added dropwise with stirring under an atmosphere of dry nitrogen keeping the temperature below 10° C.

The mixture was then allowed to come to room temperature and was stirred for 3½ hours. Gas evolution became slow after 3 hours and the temperature did not exceed 29° C. at any time.

The mixture was then cooled and treated dropwise with methanol to decompose the excess hydride. It was then poured onto a large volume of cold water and extracted with benzene. The benzene phase was washed several times with water and then dried over anhydrous sodium sulphate. Evaporation of the solvent gave a viscous oil (3.01 g.) which by thin-layer chromatography on alumina in 1:1 benzene:cyclohexane appeared to be almost pure product.

EXAMPLE 9

Preparation of 5-allyl-5-hydroxymethyldibenzo[a,d][1,4]cycloheptadiene (XIII)

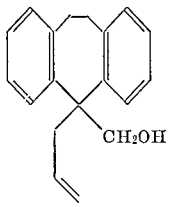

To a stirred solution of lithium aluminum hydride (2.6 g.) in anhydrous ether (100 ml.) was added dropwise a solution of compounds XII (8.5 g.; 10.30 mmoles) in anhydrous ether (40 ml.). After the addition had been completed (ca. 20 minutes) the reaction mixture was refluxed for thirty minutes. The reaction mixture was then cooled in ice and the excess hydride was decomposed by the dropwise addition of cold water. The mixture was washed with 10% aqueous sulfuric acid (80 ml.) and the organic layer was separated, dried over anhydrous potassium carbonate and then concentrated at reduced pressure. This procedure yielded 7.3 g. (98.5%) of a viscous oil which was purified by distillation at reduced pressure. The fraction boiling at 130–138° C./0.003 mm. was collected.

*Analysis.*—Calcd. for $C_{19}H_{20}O$ (percent): C, 86.32; H, 7.63. Found (percent): C, 85.76; H, 7.74.

EXAMPLE 10

Preparation of spiro[dibenzo[a,d][1,4]cycloheptadiene-5,4′-tetrahydrofurfuryl bromide] (VI)

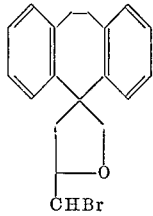

To a stirred and cooler solution of 6 g. (22.6 mmoles) of compound XIII in carbon tetrachloride (25 ml.) was added, dropwise, a solution of 3.62 g. (22.6 mmoles) of bromine in carbon tetrachloride (25 ml.). After the addition had been completed the reaction mixture was washed with a 5% aqueous sodium bicarbonate solution (100 ml.). The organic phase was dried over anhydrous sodium sulfate and then concentrated at reduced pressure leaving an oil which crystallized upon addition of petroleum ether. After two recrystallizations from a benzene-petroleum ether mixture, the pure material melted at 103–104° C.

*Analysis.*—Calcd. for $C_{19}H_{19}BrO$ (percent): C, 66.50; H, 5.58. Found (percent): C, 66.72; H, 5.38.

EXAMPLE 11

Preparation of spiro[dibenzo[a,d][1,4]cycloheptadiene-5,4′-N,N-dimethyltetrahydrofurfurylamine] oxalate

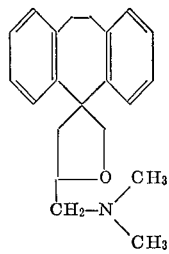

A total of 2 g. (44.5 mmoles) of gaseous dimethylamine was introduced into a cooled solution of 1.47 g. (4.3 mmoles) of compound VI in dimethyl sulfoxide (15 ml.) contained in a glass tube. The tube was sealed and then heated at 55–60° C. during 16 hours. After cooling, the reaction mixture was poured into water (50 ml.) and extracted with benzene (50 ml.). The benzene extract was washed with water (3×50 ml.) and then extracted with a 2 N solution of aqueous hydrochloric acid (50 ml.). The aqueous phase was basified with sodium carbonate and extracted with benzene (150 ml.). The benzene solution was dried over anhydrous potassium carbonate and then concentrated at reduced pressure. The residue oil was dissolved in methanol and converted into an oxalate by treatment with a methanolic solution of anhydrous oxalic acid. The crystalline product was recrystallized twice from a methanol-ether mixture and dried over phosphorus pentoxide, in vacuo, at 45° C. for 20 hours. There was thus obtained 1.52 g. (84%) of the product which contained ½ mole of methanol of crystallization; M.P. 115–120° C. with shrinking starting at 100° C.

*Analysis.*—Calcd. for $C_{21}H_{23}NO \cdot C_2H_2O_4 \cdot ½CH_3OH$ (percent): C, 68.02; H, 6.84; N, 3.37. Found: (percent): C, 68.10; H, 7.06; N, 3.29.

EXAMPLE 12

Preparation of spiro[dibenzo[a,d][1,4]cycloheptadiene-5,4′ - N-methyltetrahydrofurfurylamine]hydrochloride (XV)

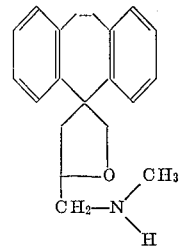

A total of 2.7 g. (87 mmoles) of gaseous methylamine was introduced into a cooled solution of 3.0 g. (8.75 mmoles) of compound VI in dimethyl sulfoxide (15 ml.) contained in a glass tube. The tube was sealed and left at room temperature for 100 hours. After cooling, the reaction mixture was poured into water (50 ml.) and extracted with benzene (50 ml.). The benzene extract was washed with water (4×50 ml.) and then extracted twice with a 1 N solution of aqueous hydrochloric acid (40 ml.). The aqueous phase was basified with potassium carbonate and extracted with benzene (40 ml.). The benzene solution was dried over anhydrous potassium carbonate and then concentrated at reduced pressure. Yield 2.1 g. (72%) of oily product. The product was dissolved in ether (40 ml.) and converted to the hydrochloride by introduction of dry hydrogen chloride. The ether was filtered off and the hydrochloride salt was recrystallized twice from a benzene-methylene chloride mixture: M.P. 179–180° C.

*Analysis.*—Calcd. for $C_{20}H_{23}NO \cdot HCl$ (percent): C, 72.82; H, 7.33; N, 4.25. Found (percent): C, 72.69; H, 7.27; N, 4.17.

EXAMPLE 13

Large scale preparation of spiro[dibenzo[a,d] [1,4] cycloheptaiene-5-4′-N-methyltetrahydrofurfurylamine] hydroclhoride Step A.—5-allyl-5-hydroxymethyldibenzo[a,d] [1,4] cycloheptadiene.

(1) 16 g. (0.42 mol.) of lithium aluminum hydride is added to a 2 ltr./3 neck flask equipper with stirrer, condenser and dropping funnel.

(2) 500 ml. (4.8 mol.) of anhydrous ether is introduced. The first 100 ml. of ether is added dropwise.

(3) 54.4 g. (0.185 mol.) of 5-allyl-5-carbomethoxydibenzo[a,d] [1,4] cycloheptadiene is dissolved in 450 ml. (4.3 mol.) of anhydrous ether and slowly added to the mixture.

(4) Time of introduction: 1 hour.

(5) The reaction mixture is refluxed for 4 hours, then cooled to 10° C.

(6) The complex is decomposed by the following procedure: Under good cooling conditions were added dropwise:
(a) 16 ml. of $H_2O$.
(b) 12 ml. of 20% NaOH.
(c) 56 ml. of $H_2O$.

(7) The mixture is filtered and washed with 500 ml. (4.8 mol.) of technical ether.

(8) The ethereal solution is dried over approximately 100 g. of sodium sulfate.

(9) The solvent is filted and evaporated to dryness.

(10) The oily residue is distilled at 165–176° C., 0.3 mm.

(11) The yield is 45 g., 91.5% colorless heavy syrup.

Step B.—Spiro[dibenzo[a,d] [1,4]cycloheptadiene-5-4'-tetrahydrofurfuryl bromide]:

(1) 45 g. (0.17 mol.) of 5-allyl-5-hydroxymethyldibenzo [a,d] [1,4]cycloheptadiene in 400 ml. (4.1 mol.) of carbontetrachloride and 13.4 g. (0.17 mol.) of pyridine are added to a 1 ltr./3 neck flask, equipped with stirrer, dropping funnel and thermometer.

(2) To the solution is introduced drop by drop 27.2 g. (0.17 mol.) of bromine dissolved in 400 ml. (4.1 mol.) of carbon tetrachloride.

(3) The temperature should be kept below 25° C.

(4) Time of introduction: 30 min.

(5) The slurry is filtered and the cake (pyridine hydrobromide) washed with 100 ml. (1 mol.) of carbon tetrachloride.

(6) The clear solution is evaporated to dryness to leave an oily residue.

(7) To the oily residue is added 100 ml. of petroleum-ether (30–60° C.).

(8) After standing for 16 hours at room temperature crystallization occurs.[1]

(9) Yield 57 g. (99%) M.P. 84–91° C.

(10) The compound can be purified by crystallization in benzene, petroleum-ether 1:4, the M.P. is then raised to 98–101° C.

Step C.—Spiro[dibenzo[a,d] [1,4]cycloheptadiene-5-4'-N-methyltetrahydrofurfurylamine] hydrochloride:

(1) 57 g. (0.147 mol.) of spiro[dibenzo[a,d] [1,4] cycloheptadiene-5-4'-tetrahydrofurfuryl bromide] is dissolved in 700 ml. (8.6 mol.) of tetrahydrofuran.

(2) To the above solution is added approximately 3 moles of liquid methylamine (from the cylinder).

(3) This solution is transferred to pressure bombs or bottles and heated for 100 hours at 50–55° C.

(4) The mixture is cooled and then evaporated to dryness.

(5) The slurry is dissolved in 1000 ml. (11 mol.) of benzene and washed three times with 150 ml. of water.

(6) The organic layer is extracted three times with 250 ml. of 3 N HCl. 13 g. of unreacted starting material can be recovered by evaporation of the organic layer.

(7) The acid extracts are cooled and made basic with a 20% solution of sodium carbonate.

(8) The liberated base is extracted with 5×200 ml. (16 mol.) of methylenechloride.

(9) The solution is dried over 200 g. of sodium sulfate, filtered and evaporated under reduced pressure.

(10) The residue is dissolved in 25 ml. of benzene and 800 ml. of petroleum-ether (30–60° C.) is added.

(11) A heavy turbidity is obtained and the solution is filtered at normal pressure over 100 g. (0.7 mol.) of potassium carbonate.

(12) The clear filtrate is evaporated under reduced pressure.

(13) The oily residue is dissolved in 500 ml. (4.8 mol.) of anhydrous ether, cooled and dry hydrogen chloride bubbled through until a heavy precipitation is obtained.

[1] This crude material was used in the next step.

(14) The solid is rapidly removed by filtration and transferred to an Erlenmeyer for crystallization.

(15) The product is dissolved in 800 ml. (9 mol.) of hot benzene. The solution is refluxed until all traces of ether are removed by evaporation. Then the product will crystallize from the hot benzene.

(16) The mixture is cooled at room temperature and filtered.

(17) 46 g. of crude compound M.P. 164–167° C. is obtained.

(18) The product is recrystallized in methylenechloridebenzene by the following procedure:

(19) 46 g. of the compound is dissolved in 50 ml. of methylenechloride; 250 ml. of benzene is added; a few seeds are also added. Then the mixture is heated to boiling to remove the methylenechloride. When all the $CH_2Cl_2$ has been removed a heavy crystallization occurs.

(20) After cooling for 16 hours the solid is removed by filtration, washed with 50 ml. of benzene and dried at 50° C. for 10 hours.

(21) The yield is 28 g. (51%) calculated on 5-allyl-5-hydroxymethyldibenzo[a,d] [1,4] cycloheptadiene.

(22) The M.P. of the product spiro[dibenzo[a,d] [1,4] cycloheptadiene - 5,4' - methyltetrahydrofurfurylamine] hydrochloride is 171–175° C. Coloration: white.

EXAMPLE 14

When in the procedure of Example 11, dimethylamine is replaced by an equal molar amount of ammonia, diethylamine, ethylamine, isopropylamine, propylamine, methylethylamine, butylamine, hexylamine, pentylamine, dibutylamine, octylamine and dipropylamine there are obtained spiro[dibenzo[a,d] [1,4] cycloheptadiene-5-4'-tetrahydrofurfurylamine]

spiro[dibenzo[a,d] [1,4] cycloheptadiene-5-4'-N,N-diethyltetrahydrofurfurylamine]

spiro[dibenzo[a,d] [1,4] cycloheptadiene-5-4'-N-ethyltetrahydrofurfurylamine]

spiro[dibenzo[a,d] [1,4] cycloheptadiene-5-4'-N-isopropyltetrahydrofurfurylamine]

spiro[dibenzo[a,d] [1,4] cycloheptadiene-5-4'-N-propyltetrahydrofurfurylamine]

spiro[dibenzo[a,d] [1,4] cycloheptadiene-5-4'-N-methyl-N-ethyltetrahydrofurfurylamine]

spiro[dibenzo[a,d] [1,4] cycloheptadiene-5-4'-N-butyltetrahydrofurfurylamine]

spiro[dibenzo[a,d] [1,4] cycloheptadiene-5-4'-N-hexyltetrahydrofurfurylamine]

spiro[dibenzo[a,d] [1,4] cycloheptadiene-5-4'-N-pentyltetrahydrofurfurylamine]

spiro[dibenzo[a,d] [1,4] cycloheptadiene-5-4'-N,N-dibutyltetrahydrofurfurylamine]

spiro[dibenzo[a,d] [1,4] cycloheptadiene-5-4'-N-octyltetrahydrofurfurylamine] and spiro[dibenzo[a,d] [1,4] cycloheptadiene-5-4'-N,N-dipropyltetrahydrofurfurylamine] respectively.

While this invention has been described and exemplified in terms of its preferred embodiment, those skilled in the art will appreciate that modifications can be made without departing from the spirit and scope of this invention.

We claim:

1. A compound having the formula

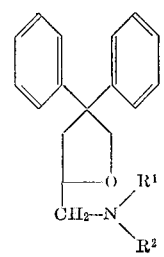

wherein R¹ and R² are each a member selected from the group consisting of hydrogen and (lower)alkyl and the pharmaceutically acceptable nontoxic salts thereof.

2. A compound of claim 1 having the formula

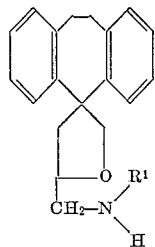

wherein R¹ is (lower)alkyl.

3. The compound of claim 1 having the formula

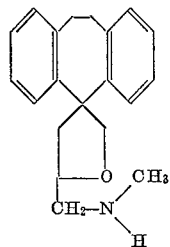

4. A pharmaceutically acceptable nontoxic salt of the compound of claim 3.

5. The compound of claim 1 having the formula

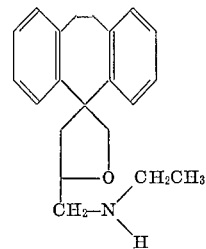

6. The compound of claim 1 having the formula

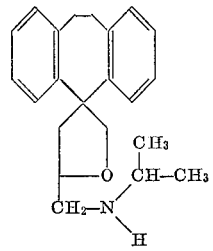

References Cited

UNITED STATES PATENTS 3,433,836   3/1969   Petracek _____ 260—347.7

ALEX MAZEL, Primary Examiner

B. I. DENTZ, Assistant Examiner

U.S. Cl. X.R.

424—285

PO-1050
(5/69)

UNITED STATES PATENT OFFICE
CERTIFICATE OF CORRECTION

Patent No. 3,532,722                 Dated    October 6, 1970

Inventor(s)  Bernard Belleau and Ivo Monkovic

It is certified that error appears in the above-identified patent and that said Letters Patent are hereby corrected as shown below:

In the claims,

Claim 1 should read:

1. A compound having the formula

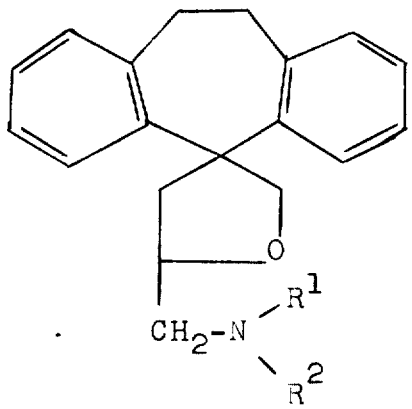

wherein $R^1$ and $R^2$ are each a member selected from the group consisting of hydrogen and (lower)alkyl and the pharmaceutically acceptable nontoxic salts thereof.

SIGNED AND
SEALED
DEC 22 1970

(SEAL)
Attest:

Edward M. Fletcher, Jr.
Attesting Officer

WILLIAM E. SCHUYLER, JR.
Commissioner of Patents